United States Patent [19]
Suzuki

[11] Patent Number: 5,013,610
[45] Date of Patent: May 7, 1991

[54] HEAT RESISTING MEMBER REINFORCED LOCALLY BY AN INORGANIC FIBER AND A PRODUCTIVE METHOD OF THE SAME

[75] Inventor: Yoshihiro Suzuki, Saitama, Japan

[73] Assignee: Izumi Industries, Ltd., Kawagoe, Japan

[21] Appl. No.: 498,708

[22] Filed: Mar. 26, 1990

[51] Int. Cl.⁵ .................. B22F 3/00; F02F 00/00; B23K 35/22
[52] U.S. Cl. .................. 428/545; 29/888.046; 75/229; 123/193 P; 148/437; 228/263.17
[58] Field of Search .............. 428/614, 545; 75/229; 123/193 H, 193 P; 148/437, 439; 29/888.046; 228/114, 263.17

[56] References Cited

U.S. PATENT DOCUMENTS

| | | | |
|---|---|---|---|
| 3,471,270 | 10/1969 | Carlson | 75/229 |
| 4,134,759 | 1/1979 | Yajima et al. | 75/229 |
| 4,706,550 | 11/1987 | Bullat | 123/193 P |

Primary Examiner—R. Dean
Assistant Examiner—Robert R. Koehler
Attorney, Agent, or Firm—Jones, Day, Reavis & Pogue

[57] ABSTRACT

In a heat resisting aluminum alloy member with local metal matrix composite which contains inorganic fibers as reinforcing material, the matrix aluminum alloy of the metal matrix composite contains very little alloying elements in order to attain the highest heat shock resistance.

7 Claims, 6 Drawing Sheets

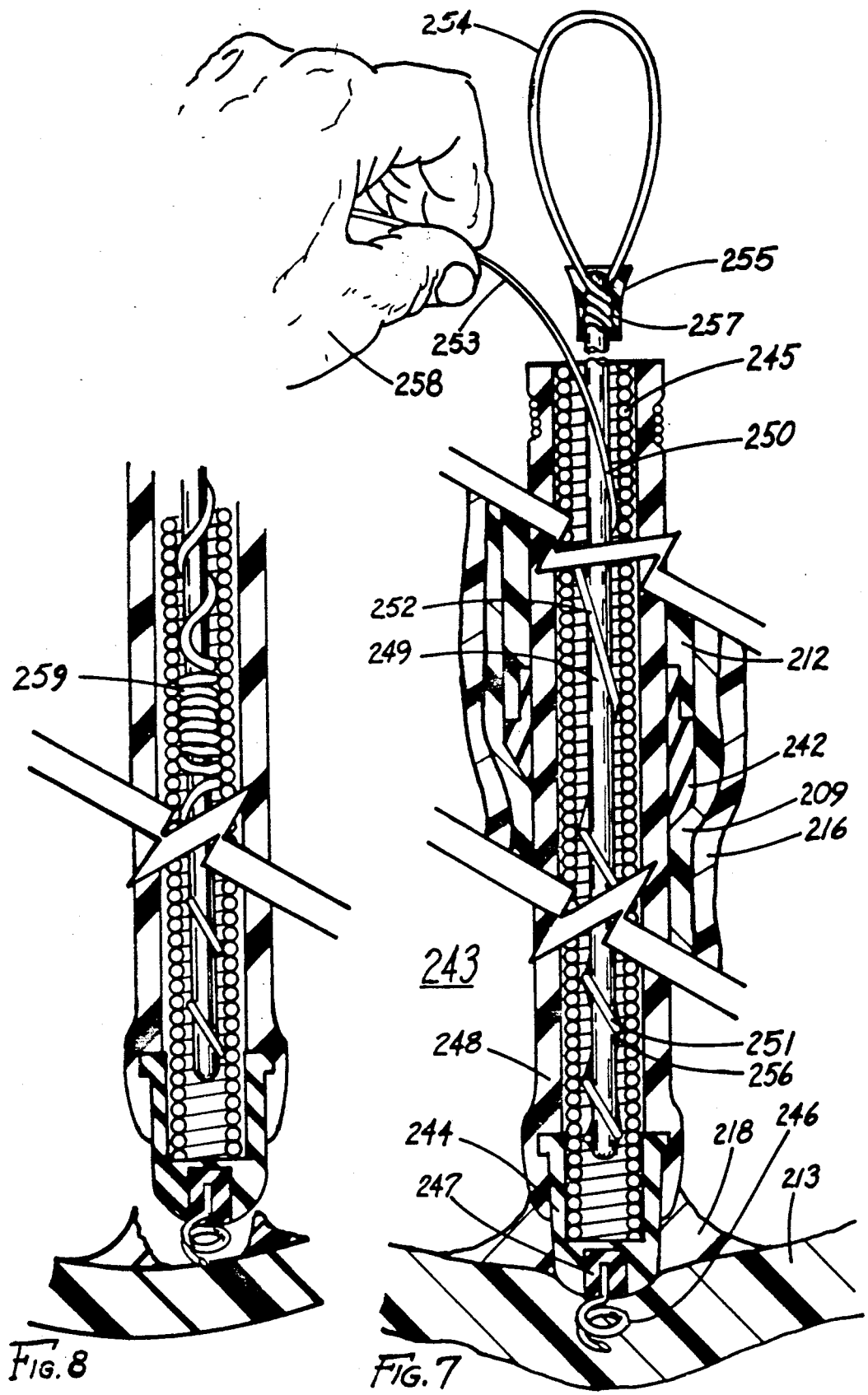

HEAT RESISTING MEMBER REINFORCED LOCALLY BY AN INORGANIC FIBER AND A PRODUCTIVE METHOD OF THE SAME

BACKGROUND OF THE INVENTION

1. Field of the Invention

This invention relates generally to a heat resisting aluminum alloy member reinforced locally by inorganic fibers, and a productive method of the same, and particularly but not exclusively is applicable to a piston head, a cylinder head and the like of an internal combustion engine.

2. Description of the Prior Art

In general, if a repetition of thermal loads is locally exerted on a member of a structure, cracks are initiated in the member due to repetition of local compression stresses at a higher temperature area and local tension stresses at cooling phase of the area, so that the life of the member is shortened.

For example, in an internal combustion engine, the repetition of thermal loads is exerted on an aluminum alloy piston head, the space between valves of an aluminum alloy cylinder head and the like, and it has been proposed already to reinforce locally such portions by metal matrix composite which contains fibrous inorganic reinforcing material, such as a SiC-whisker or a silicon nitride whisker, so as to prolong the life of the aluminum alloy piston, etc. (for example, see Japanese Laid Open Patent No. 62-233456).

However, the thermal expansion coefficient of the reinforced portion becomes very small compared with that of non-reinforced body portion, so that a difference of thermal expansion coefficient at an interface between the reinforced portion and the non-reinforced body portion of the member will cause a high stress at the interface at higher temperatures and finally cracks are initiated in the interface under the repetition of thermal loads.

One of effective means escaping from such damage is to enlarge the reinforced portion to keep the interface away from the hottest zone, lest the interface should be exposed to high temperatures, but according to such means, the amount of the expensive inorganic fiber increases to make the reinforced portion, and as a result, the cost of the heat resisting member will be raised.

OBJECTS AND SUMMARY OF THE INVENTION

Accordingly, it is an object of the present invention to provide a heat resisting aluminum alloy member with local metal matrix composite on which cyclic thermal load is applied, and a productive method of the same, wherein cracks are not initiated even under the repetition of heat cycles, and the manufacturing cost is reduced.

Another object of the invention is to provide a heat resisting aluminum alloy member with local metal matrix composite and a productive method of the same, wherein the combination of a matrix and reinforcing material for the metal matrix composite is optimized so as to give the highest heat resistant property to the metal matrix composite, and thus, the components of the aluminum alloy matrix to form the metal matrix composite are generally different from those of the aluminum alloy matrix of the body portion of the heat resisting member.

In accordance with an aspect of this invention, a heat resisting member of aluminum alloy with local metal matrix composite which comprises inorganic fibers, the matrix aluminum alloy of the metal matrix composite contains Si, Cu, Ni and Mg at less than 1%; Fe and Mn, which exist as impurities, at less than 0.5%; and other impurities at less than 0.3%. Higher content of the above alloying elements will reduce the heat resistant property of the metal matrix composite containing fibrous material.

In preferred embodiment of this invention, a voloumetric ratio of the inorganic fibers of the metal matrix composite lies within a range of 5 to 25%.

Moreover, in a productive method of a heat resisting member with local metal matrix composite, the reinforcing materal in the metal matrix composite is inorganic fiber, and an aluminum alloy matrix reinforced by the inorganic fibers contains Si, Cu, Ni and Mg at less than 1%; Fe and Mn, which exist as impurities, at less than 0.5%; and other impurtieis at less than 0.3%, and the metal matrix composite is welded to the body portion of the heat resisting member so as to locally reinforce the heat resisting member.

The above, and other objects, features and advantages of this invention, will be apparent from the following detailed description of an illustrative embodiment thereof to be read in connection with the accompanying drawings, wherein like reference numerals identify the same or corresponding parts in the several views.

DETAILED DESCRIPTION OF A PREFERRED EMBODIMENT

According to several test results to increase the heat shock resistance of metal matrix composites, alloying elements which are added to an aluminum alloy matrix to increase its strength exert rather an unfavorable influence upon crack initiation caused by cyclic thermal shocks, and inorganic fibers in the metal matrix composite produce a very good effect on the crack prevention. That is, when the alloying elements, such as Si, Cu, Ni, Mg and the like, exist at less than 1%, the elongation, at high temperatures, of the aluminum alloy is very improved. Further, it produces a good effect on the crack prevention if the aluminum alloy contains Fe and Mn, which exist as impurities, at less than 0.5%, and other impurities at less than 0.3%.

A metallic fiber, a carbon fiber, an alumina fiber, a boric alumina fiber or an alumina-silica fiber can be used as the fibrous inorganic material and whisker such as Sic, silicon nitride or boric alumina produces a better effect on the crack prevention. Further, the volumetric ratio of the inorganic fiber should be selected within a range of 5 to 25%, because heat resistant property is hardly improved if the volumetric ratio is at less than 5%, and if the volumetric ratio is at more than 25%, the thermal expansion coefficient of the metal matrix composite becomes too small, compared with that of the body member, so that cracks are easily initiated in an interface between the metal matrix composite and the body member aluminum alloy due to great difference of the coefficients of expansion between them.

A metal matrix composite is made of a inorganic fiber whose volumetric ratio is selected within the range of 5 to 25%, and an aluminum base metal which contains Si, Cu, Ni and Mg at less than 1%; Fe and Mn at less than 0.5%; and impurities at less than 0.3%, and thereafter, welded to the body portion of a heat resisting member by election beam welding, friction welding or the like so as to obtain the partially reinforced heat resisting member. Thus, it is easy to make the body portion of the heat resisting member complicated in structure.

Figure 7:
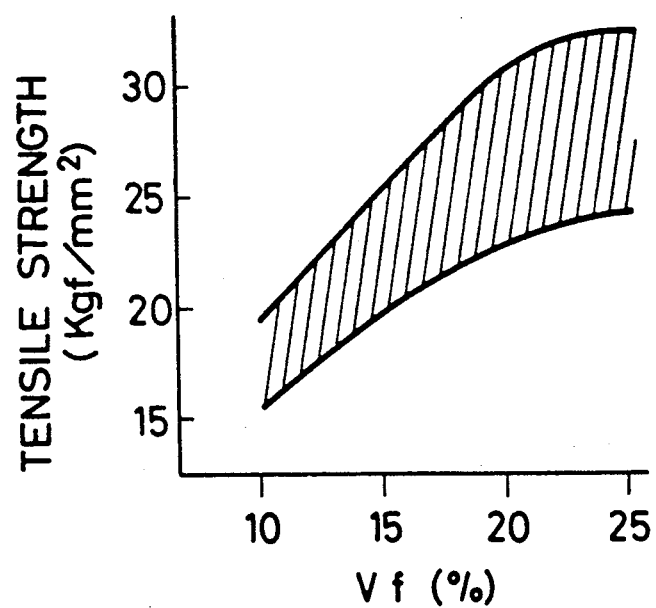
FIGS. 7 is a graphical representation for a volumetric ratio - tensile strength relationship of the reinforced portion of the piston of FIG. 6.
Figure 1:
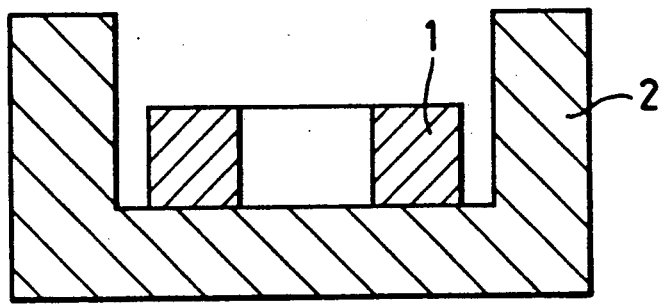
Figure 2:
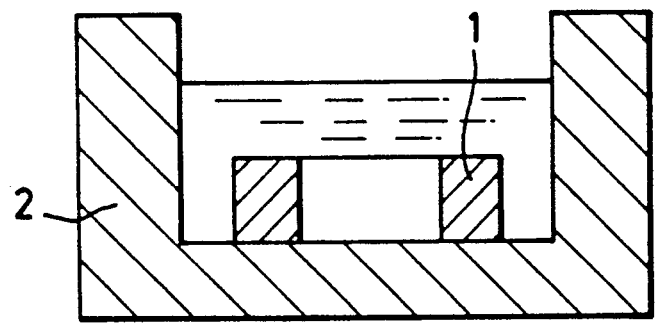
Figure 3:
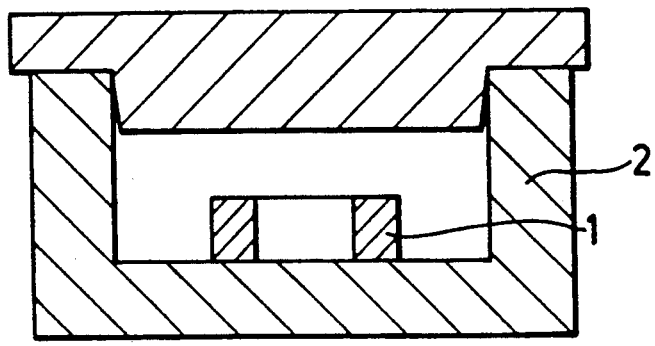
Figure 1:
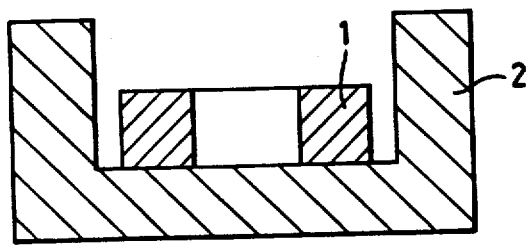
Figure 2:
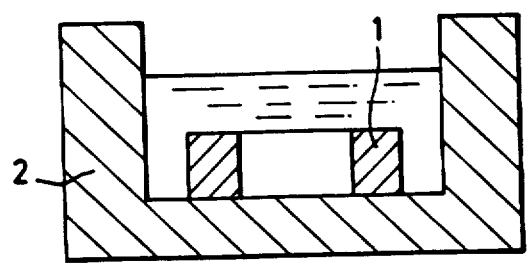
Figure 3:
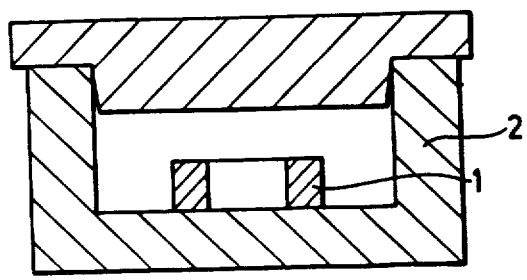
Figure 7:
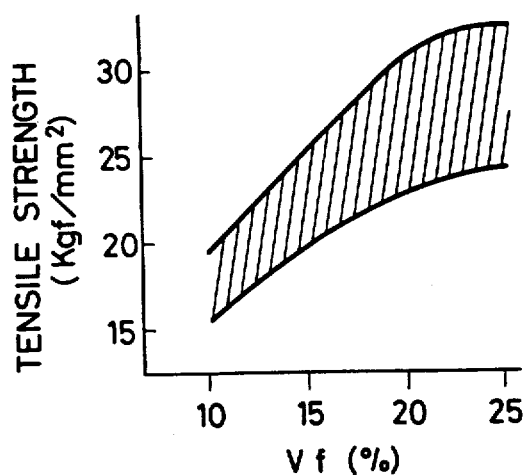

Referring to the drawings and table, and initially to FIG. 1, a preform 1 is made of Sic-whisker (manufactured by "Tokai-Carbon" Co, Ltd. and identified by "β-type whisker") so as to have a volumetric ratio $V_f$ of 15%, and set in a metal mold 2. Then, molten pure aluminum of 99.7% is poured into the metal mold 2 as shown in FIG. 2, and a pressure of 800 kgf/cm$^2$ is applied on the molten aluminum to squeeze the melt into the fine cavities of the whisker preform (FIG. 3) to produce the metal matrix composite. The composite is machined to the form 3 in FIG. 4. Shown in FIG. 7 is a relationships between $V_f$ of reinforcing fiber in the metal matrix composite and the tensile strength of the metal matrix composite.

Figure 5:
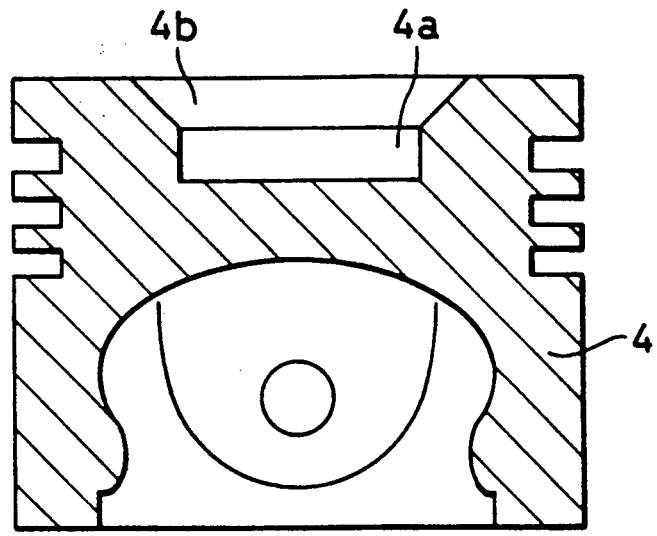
Figure 6:
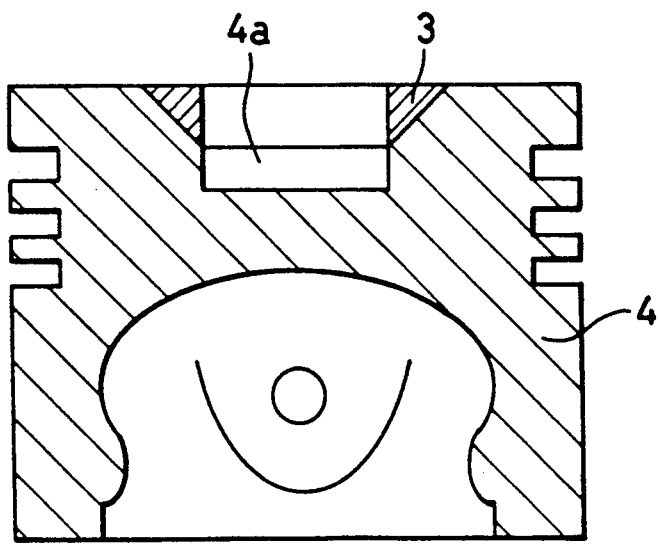

A piston body 4 to be reinforced by the metal matrix composite 3 is made of aluminum alloy (JIS:AC8A) by gravity casting, and in the piston body 4, a tapered portion 4b is provided on the outlet of the combustion chamber 4a as shown in FIG. 5 to fit the metal matrix composite 3 therein. The metal matrix composite 3 is welded to the piston body 4 by electron beam welding (FIG. 6).

Figure 10:
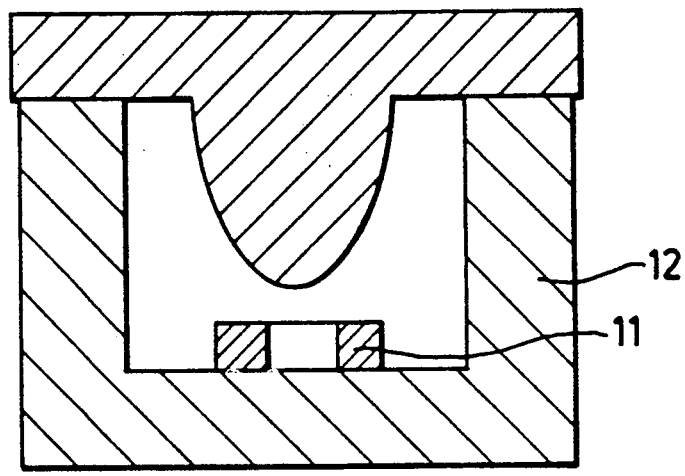
FIGS. 8 to 11 are explanatory drawings of a process to make a conventional piston.
Figure 11:
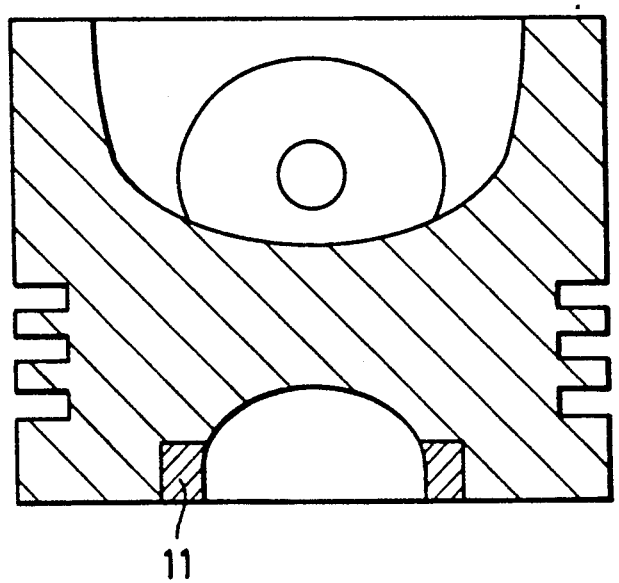
Figure 8:
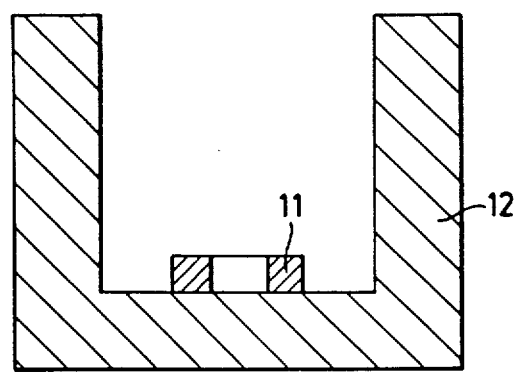
Figure 9:
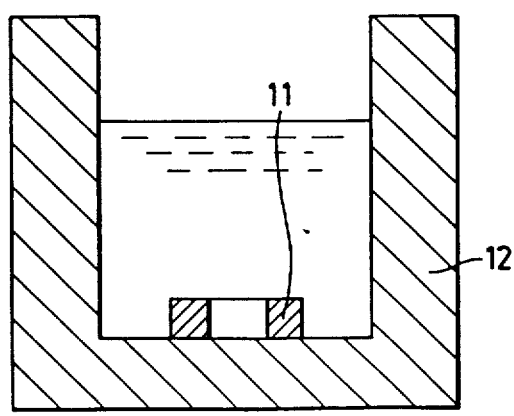
Figure 10:
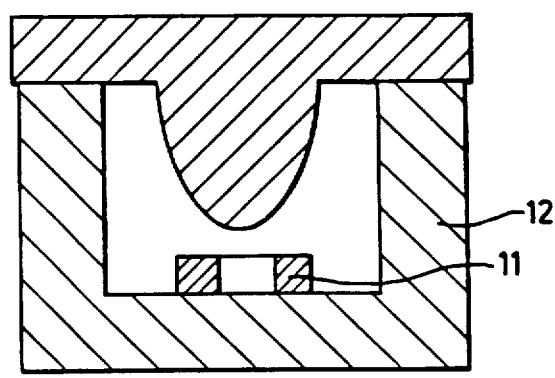
Figure 11:
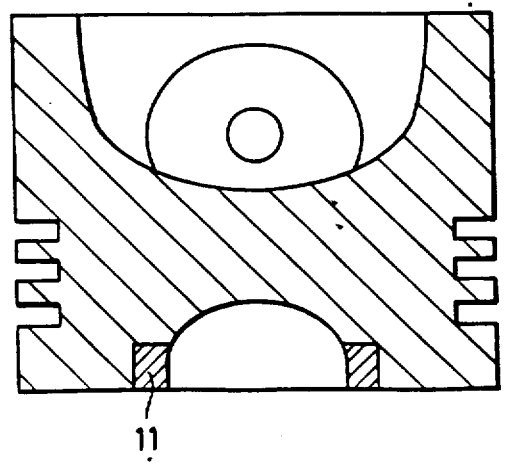
Figure 12:
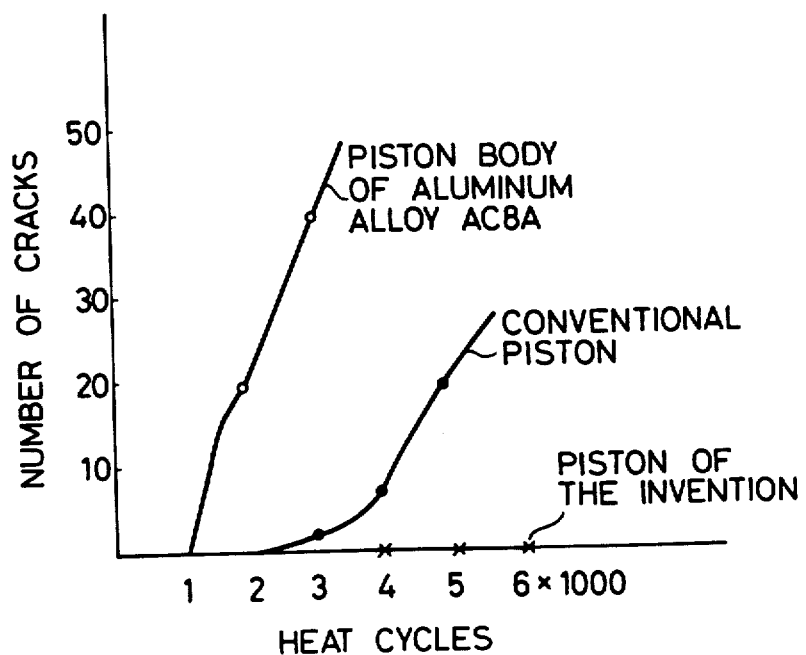

A piston to be compared with the above piston is made by a conventional process. That is, a preform 11 is made of Sic-whisker (the same as that described above) so as to have a volumetric ratio $V_f$ of 15%, and set in a metal mold 12 as shown in FIG. 8. Then, molten aluminum alloy (JIS:AC8A) is poured into the metal mold 12 (FIG. 9), and after the metal mold 12 is closed up tight as shown in FIG. 10, the melt is squeezed into fine cavities of the whisker preform under a pressure of 800 kgf/cm$^2$ to form local metal matrix composite on a piston head. Thereafter, the piston shown in FIG. 11 is machined from the casting.

A thermal shock test is conducted to compare the piston of this invention with the conventional piston. The piston is exposed to alternate temperatures of 400° and 150° C., and the cycle is 12 seconds.

Figure 12:
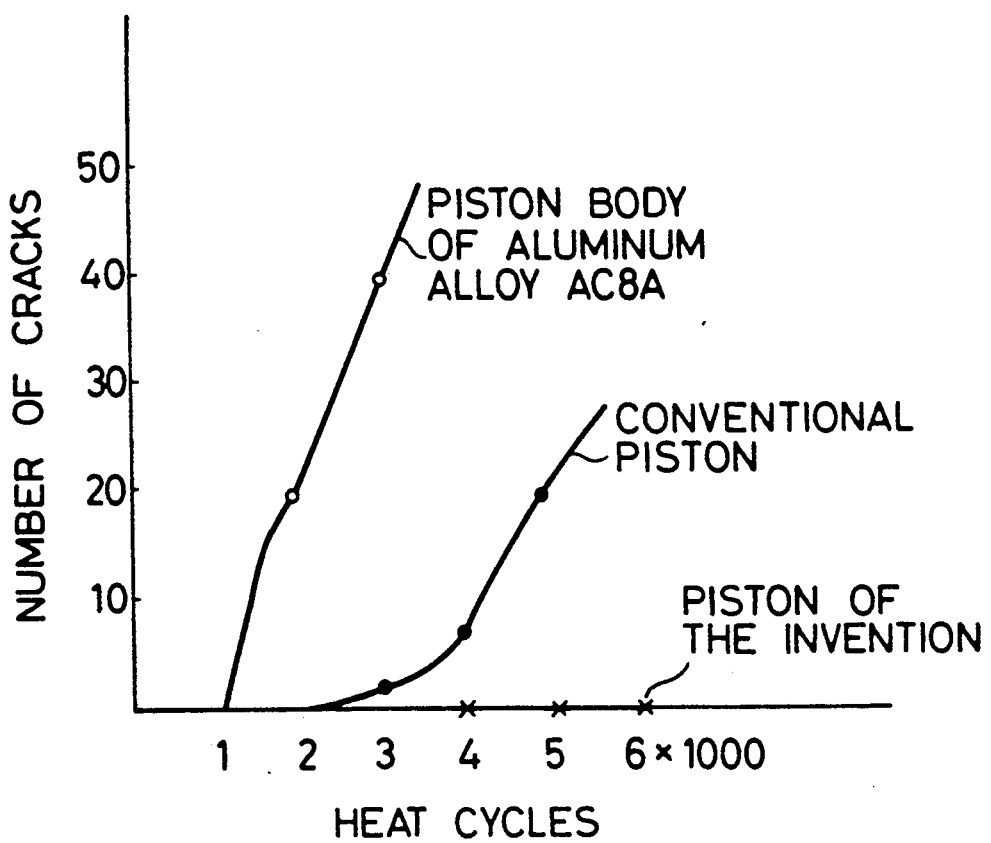
FIG. 12 is a graphical representation of heat cycle - number of cracks relationships for the three kind of pistons.

As shown in FIG. 12, no crack is found in the piston of this invention even after repetition of 6000 heat cycles, but in the conventional piston and in a piston made of aluminum alloy AC8A only, cracks are found after repetition of 3000 cycles and 1000 cycles, respectively. Further, many cracks are initiated at the interface between the piston body and the outer periphery of the reinforced portion of the conventional piston, but in the piston of this invention, no crack is found at the above interface. It is noted that the lengths of the outer periphery and the inner periphery are 60 mm and 50 mm, respectively.

According to Table 1, the coefficient of expansion of the piston body is nearer to that of the reinforced portion of the piston of this invention than to that of the reinforced portion of the conventional piston. It seems a reason why the piston of this invention shows no crack at the interface between reinforced portion and the body portion.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

In the embodiment, the invention is applied to the piston of the internal combustion engine, but it is widely applicable to such members which are exposed to a cyclic local thermal load as to be locally exposed to the repetition of heat cycles. Further, in the embodiment, the composite material 3 is fixed to the piston body 4 by electron beam welding, but it can be fixed also by friction welding.

The matrix alloy of the reinforced portion contains only a small amount of alloying elements, which are added normally to aluminum alloy members but have negative effects on thermal shock resistance, in order to attain the best thermal shock resistance of the metal matrix composite which contains inorganic fibrous material as a reinforcing material. As silicon which reduces thermal expansion coefficient of aluminum alloys is not included in the reinforced portion of the heat resisting member, the thermal expansion coefficient of the reinforced portion increases, resulting in smaller difference of the coefficients of expansion between the body portion and the reinforced portion of the heat resisting member becomes, so that no crack is initiated in the interface between the body portion and the reinforced portion of the member.

Moreover, the composite material and the body portion of the heat resisting member are made separately, so that the body portion can be molded by gravity casting. Therefore, it is easy to reduce the manufacturing cost of the member.

TABLE 1

| Coefficient of Expansion ($\times 10^{-6}/C.°$) within a Range of 20 to 300° C. | |
| --- | --- |
| Piston body, common to the two kinds of tested pistons, of aluminum alloy AC8A | 22.3 |
| Reinforced portion of the conventional piston | 16.1 |
| Reinforced portion of the piston of this invention | 19.5 |

What is claimed is:

1. A heat resisting member, comprising:
   an unreinforced body portion constructed from a first aluminum alloy, wherein the thermal expansion coefficient of said first aluminum alloy is reduced by the presence of silicon;
   a reinforced metal matrix composite portion constructed from a second aluminum alloy with inorganic fibers as reinforcing material, wherein the thermal expansion coefficient of said second aluminum alloy is increased in order to reduce the difference in thermal expansion coefficients between said body portion and said reinforced portion by said second aluminum alloy consisting of (a) aluminum, (b) Si, Cu, Ni, and Mg at less than 1% by weight, (c) Fe and Mn, which exist as impurities, at less than 0.5% by weight, and (d) other impurities at less than 0.3% by weight.

2. A heat resisting member according to claim 1 wherein a volumetric ratio of the inorganic fibers to said second aluminum alloy in said reinforced metal matrix composite portion lies within a range of 5 to 25 volume %.

3. A heat resisting member according to claim 2 wherein said reinforced metal matrix composite portion is welded to said unreinforced body portion.

4. A heat resisting member according to claim 3 wherein said reinforced metal matrix composite portion is made by pouring said second aluminum alloy in a molten state into a metal mold containing a whisker preform which is then subjected to a pressure on the order of 800 kgf/cm$^2$.

5. A heat resisting member according to claim 1 wherein the silicon content of said first aluminum alloy is on the order of 12% by weight.

6. A method for making a heat resisting member, comprising the steps of:

constructing an unreinforced body portion from a first aluminum alloy, the thermal expansion coefficient of said body portion being reduced by the presence of silicon in said first aluminum alloy;

constructing a reinforced metal matrix composite portion from a second aluminum alloy reinforced with inorganic fibers, wherein the thermal expansion coefficient of said second aluminum alloy is increased in order to reduce the difference in thermal expansion coefficients between said body portion and said reinforced portion by said second aluminum alloy consisting of (a) aluminum, (b) Si, Cu, Ni, and Mg at less than 1% by weight, (c) Fe and Mn, which exist as impurities, at less than 0.5% by weight, and (d) other impurities at less than 0.3% by weight; and, welding said body portion to said reinforced portion.

7. The method as set forth in claim 6 wherein said reinforced metal matrix composite portion is made by pouring said second aluminum alloy in a molten state into a metal mold containing a whisker preform which is then subjected to a pressure on the order of 800 kgf/cm$^2$.

* * * * *

UNITED STATES PATENT AND TRADEMARK OFFICE
CERTIFICATE OF CORRECTION

PATENT NO. : 5,013,610

DATED : May 7, 1991

INVENTOR(S) : Yoshihiro Suzuki

It is certified that error appears in the above-identified patent and that said Letters Patent is hereby corrected as shown below:

The drawings sheets, consisting of FIGS. 1 - 12, should be deleted and and substitute therefor drawing sheets 1-6 (FIGS. 1-12), as shown on the attached pages.

Signed and Sealed this

Sixteenth Day of February, 1993

*Attest:*

STEPHEN G. KUNIN

*Attesting Officer*     *Acting Commissioner of Patents and Trademarks*

Figure 4:
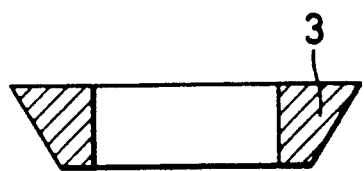
FIGS. 1 to 6 are explanatory drawings of a process to make a piston according to an embodiment of this invention.

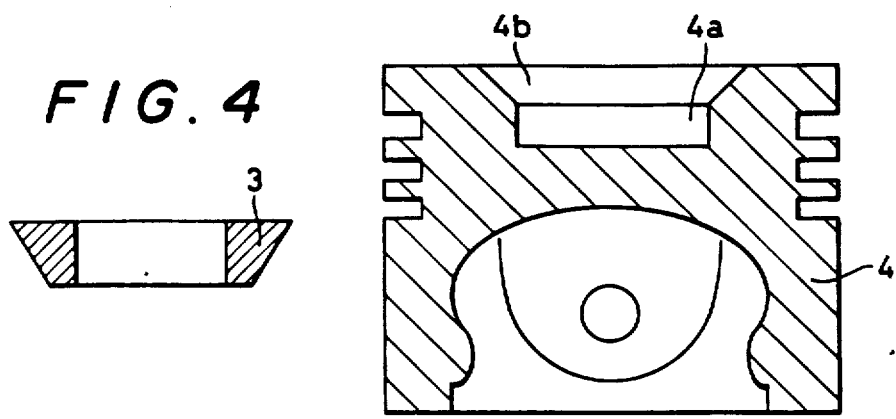
FIG. 4
FIG. 5
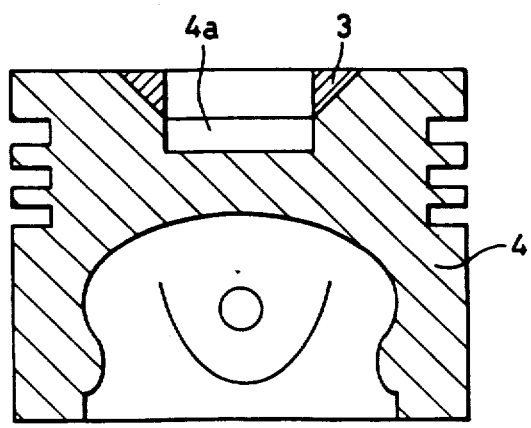
FIG. 6